(12) United States Patent
Yurkov et al.

(10) Patent No.: US 9,165,347 B2
(45) Date of Patent: Oct. 20, 2015

(54) METHOD OF AND APPARATUS FOR LOCAL OPTIMIZATION TEXTURE SYNTHESIS 3-D INPAINTING

(75) Inventors: Kirill Valerjevich Yurkov, Saint-Petersburg (RU); Alexei Vladimirovich Belyakov, Saint-Petersburg (RU)

(73) Assignee: INTEL CORPORATION, Santa Clara, CA (US)

( * ) Notice: Subject to any disclaimer, the term of this patent is extended or adjusted under 35 U.S.C. 154(b) by 199 days.

(21) Appl. No.: 13/997,581

(22) PCT Filed: Dec. 30, 2011

(86) PCT No.: PCT/RU2011/001057
§ 371 (c)(1),
(2), (4) Date: Jun. 24, 2013

(87) PCT Pub. No.: WO2013/100789
PCT Pub. Date: Jul. 4, 2013

(65) Prior Publication Data
US 2013/0315498 A1    Nov. 28, 2013

(51) Int. Cl.
*G06K 9/00*  (2006.01)
*G06T 5/00*  (2006.01)
*G06T 7/00*  (2006.01)

(52) U.S. Cl.
CPC ............... *G06T 5/005* (2013.01); *G06T 7/0075* (2013.01); *G06T 2207/10021* (2013.01); *G06T 2207/10024* (2013.01); *G06T 2207/20136* (2013.01)

(58) Field of Classification Search
None
See application file for complete search history.

(56) References Cited

U.S. PATENT DOCUMENTS

| 8,761,542 B2* | 6/2014 | Weiss | 382/275 |
| 2009/0190852 A1* | 7/2009 | Lim et al. | 382/256 |
| 2011/0123113 A1* | 5/2011 | Berretty et al. | 382/173 |
| 2012/0114225 A1* | 5/2012 | Lim et al. | 382/154 |
| 2013/0315498 A1* | 11/2013 | Yurkov et al. | 382/254 |

OTHER PUBLICATIONS

Jia et al. "Image Repairing: Robust Image Synthesis by Adaptive ND Tensor Voting" IEEE 2003.*
"Notification Concerning Transmittal of International Preliminary Report on Patentability, Chapter I of the Patent Cooperation Treaty", Jul. 10, 2014, for International Application No. PCT/RU2011/001057, 9 pages.
"PCT Notification of Transmittal of the International Search Report and the Written Opinion of the International Searching Authority, or the Declaration", dated Sep. 24, 2012, for International Application No. PCT/RU2011/001057, 15pgs.
Ismael Daribo. et al., "Depth-aided image inpainting for Novel View Synthesis", 2010 IEEE International Workshop on Multimedia Signal Processing (MMSP '10), Saint Malo, France, Oct. 4-6, 2010, IEEE, Piscataway, USA, Oct. 4, 2010, XP031830576, ISBN: 978-1-4244-8110-1, (pp. 167-170, 4 total pages).

(Continued)

*Primary Examiner* — Sean Motsinger
(74) *Attorney, Agent, or Firm* — Buckley, Maschoff & Talwalkar LLC (57) ABSTRACT

An apparatus, system, method, and article to continue border lines into an unknown region of an image from a known background; determine segments, based on the continued borders, for the unknown region of the image; and propagate pixels from a known area of the image to the unknown area based on the determined segments and continued borders.

12 Claims, 7 Drawing Sheets

(56) References Cited

OTHER PUBLICATIONS

Lam C. Tran et al., "View Synthesis Based on Conditional Random Fields and Graph Cuts", 2010 17th IEEE International Conference on Image Processing (ICIP 2010), Hong Kong, Sep. 26-29, 2010, IEEE, Piscatawy, NJ, USA, Sep. 26, 2010, XP031810761, ISBN: 978-1-4244-7992-4, (pp. 433-436, 4 total pages).

Zinovi Tauber et al., "Review and Preview: Disocclusion by Inpainting for Image-Based Rendering", IEEE Transactions on Systems, Man, and Cybernetics: Part C: Applications and Reviews, IEEE Service Center, Piscataway, NJ, US, Vool. 37, No. 4, Jul. 1, 2007, XP011186115, ISSN: 1094-6977, DOI: 10.1109/TSMCC.2006.886967, (pp. 527-540, 14 total papes).

* cited by examiner

CONTINUE BORDER LINES INTO AN UNKNOWN REGION OF AN
IMAGE FROM A KNOWN BACKGROUND

205

DETERMINE SEGMENTS, BASED ON THE CONTINUED BORDERS,
FOR THE UNKNOWN REGION OF THE IMAGE

210

PROPAGATE PIXELS FROM A KNOWN AREA OF THE IMAGE TO
THE UNKNOWN AREA BASED ON THE DETERMINED SEGMENTS
AND CONTINUED BORDERS

METHOD OF AND APPARATUS FOR LOCAL OPTIMIZATION TEXTURE SYNTHESIS 3-D INPAINTING

BACKGROUND

The problem of missing image areas occurs particularly in three dimensional (3D) processing where one attempts to restore multiple views from a video stereo pair of images or from one view and pixel depth information. Generating (3D) information from a stereo image is a significant task in 3-D and other multi-view image processing. In multi-view images, there may be areas or regions of an image that are unknown or missed. Inpainting techniques may provide a mechanism for filling in the unknown image area with visually plausible content.

BRIEF DESCRIPTION OF THE DRAWINGS

Aspects of the present disclosure herein are illustrated by way of example and not by way of limitation in the accompanying figures. For purposes related to simplicity and clarity of illustration rather than limitation, aspects illustrated in the figures are not necessarily drawn to scale. Further, where considered appropriate, reference labels have been repeated among the figures to indicate corresponding or analogous elements.

DETAILED DESCRIPTION

The following description describes an image processor device or system that may support processes and operation to improve efficiency and accuracy of generating disparity maps. The disclosure herein provides numerous specific details such regarding a system for implementing the processes and operations. However, it will be appreciated by one skilled in the art(s) related hereto that embodiments of the present disclosure may be practiced without such specific details. Thus, in some instances aspects such as control mechanisms and full software instruction sequences have not been shown in detail in order not to obscure other aspects of the present disclosure. Those of ordinary skill in the art will be able to implement appropriate functionality without undue experimentation given the included descriptions herein.

References in the specification to "one embodiment", "some embodiments", "an embodiment", "an example embodiment", "an instance", "some instances" indicate that the embodiment described may include a particular feature, structure, or characteristic, but that every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some embodiments herein may be implemented in hardware, firmware, software, or any combinations thereof. Embodiments may also be implemented as executable instructions stored on a machine-readable medium that may be read and executed by one or more processors. A machine-readable storage medium may include any tangible non-transitory mechanism for storing information in a form readable by a machine (e.g., a computing device). In some aspects, a machine-readable storage medium may include read only memory (ROM); random access memory (RAM); magnetic disk storage media; optical storage media; flash memory devices; and electrical and optical forms of signals. While firmware, software, routines, and instructions may be described herein as performing certain actions, it should be appreciated that such descriptions are merely for convenience and that such actions are in fact result from computing devices, processors, controllers, and other devices executing the firmware, software, routines, and instructions.

We provide the 3D inpainting algorithm especially for the case of 3D multiview problem. This implies that there exists the information about pixels depth which was obtained by analysis of stereophonic video stream.

In some embodiments herein, for each missed area or region of an image, (1) a determination is made regarding the which side of the missed area belongs to background of the image and which side belongs to an object of the image and the border(s) information is continued into the missed area from adjoining background; (2) the continued borders are used to generate segments in missed area; and (3) the segments configuration and the borders information is used to fill missed area. These steps are depicted in the flow diagram of FIG. 2.

Figure 2:
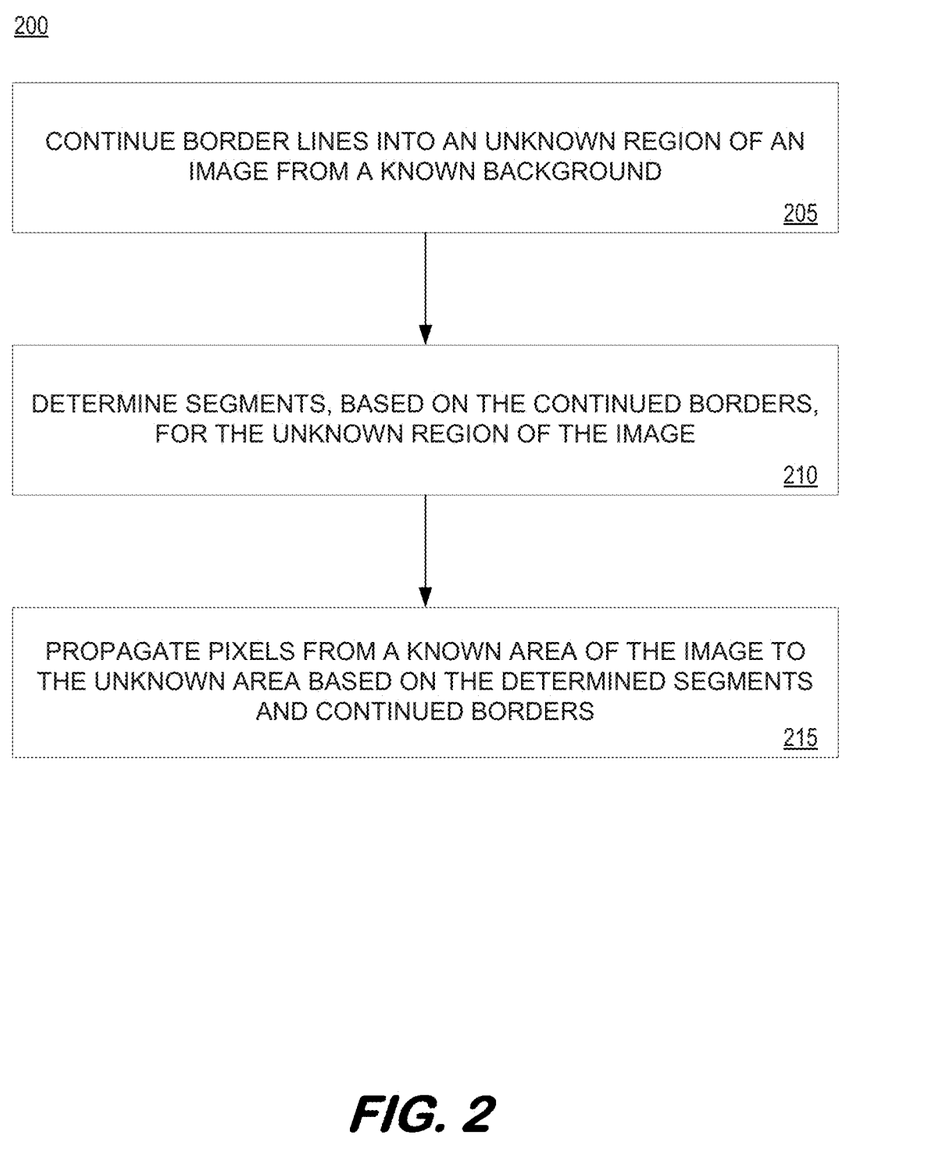
FIG. 2 is a flow diagram of a process, in accordance with one embodiment.

FIG. 2 illustrates a process 200 that includes a border(s) continuation operation at 205, a preferable patches definition operation at 210, and a local optimum 3D inpainting by structure propagation operation at 215. Each of these operations will be discussed in greater detail hereinbelow.

As used herein, to the input image of h×w dimensions as image I. Each pixel of the image consists of three color components $(x_r, x_g, x_b)$ and has the coordinates $(x_h, x_w)$ in the image. Each pixel x∈I has a characteristic function of:

$$\mu(x) = \begin{cases} 0, & x \text{ is unknown} \\ 1, & x \text{ is known} \end{cases}$$

Herein, we may assume that for known pixels there exists information about pixel segments and pixel depth, refer to here as s(x) and d(x), respectively. In one embodiment, a larger value of d(x) means that the pixel is closer to the viewer as compared to a pixel with a smaller d(x) value.

Figure 1:
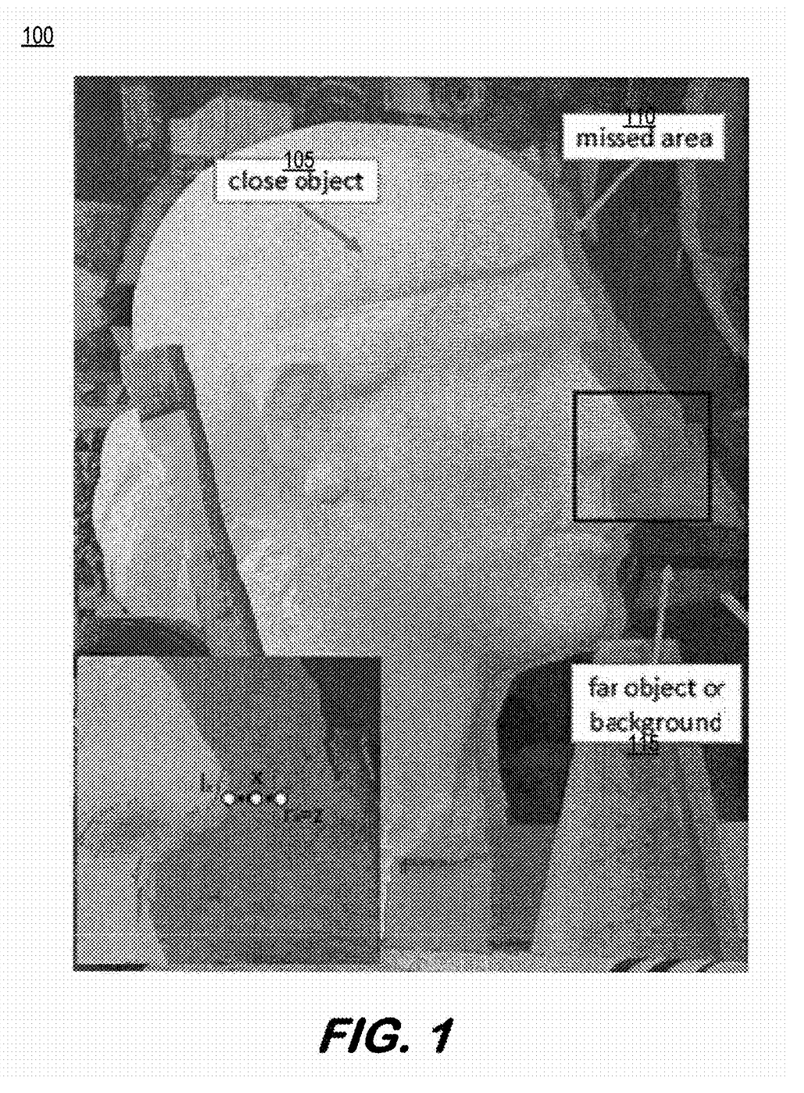
FIG. 1 is an illustrative depiction of an image including regions of unknown pixels, according to some embodiments herein.

Without any loss of generality, herein it is assumed that the missed area $\Omega = \{x \in I | \mu(x) = 0\}$ has one connectivity component. The border of Ω is defined as ∂Ω. Examples of an image missed area are provided in FIG. 1 at 110. The known part of the image is defined as $\overline{\Omega}$, part of which is illustrated at 105 of FIG. 1.

In some embodiments, the set of the eight closest points to a given point x∈I is defined as B(x). Also, the border characteristic function for known pixels $x \in I \setminus \Omega$ is defined as:

$$\chi(x) = \begin{cases} 1, & \exists\, y \in B(x): \mu(y) = 1, s(y) \neq s(x) \\ 0, & \text{otherwise} \end{cases}$$

Figure 3A:
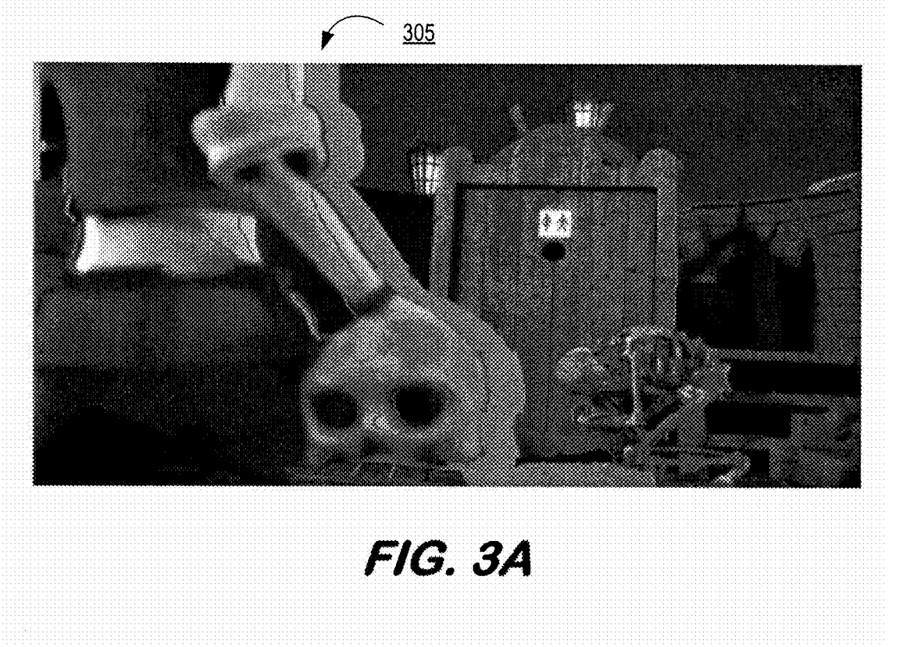
FIGS. 3A-C depict an image at different stages of refinement, in accordance with one embodiment.
Figure 3B:
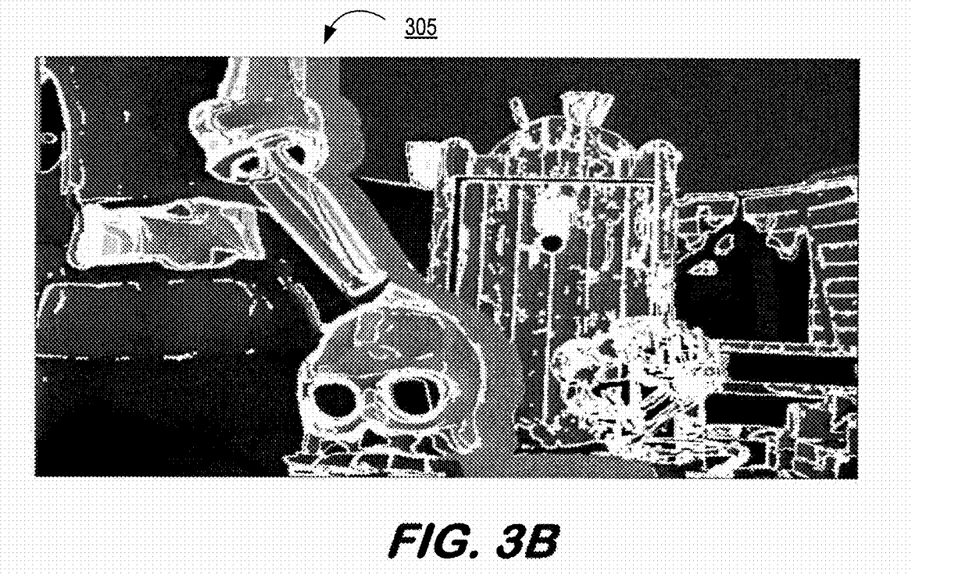
Figure 3C:
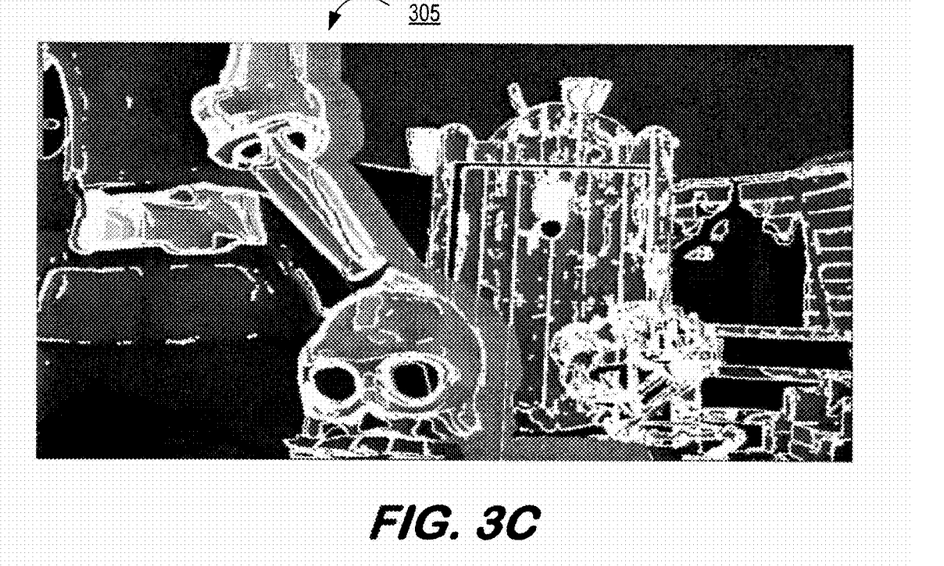

This function marks the pixels in known area that belongs to the segments border. Typical border information is illustrated in FIGS. 3A-C.

Referring to the borders continuation operation 205 of process 200, the borders continuation technique produces an approximation of direct border lines into an unknown area.

For each point $x \in \Omega$ embodiments herein define two congruent points $l_x, r_x \in \partial\Omega$. These points lie on the same image line as x, but belong to the border of the missed area as shown, for example, in FIG. 1 at 110. One candidate for continuation is selected by choosing the point with minimum depth as represented by:

$$z = \arg\min_{y \in \{l_x, r_x\}} d(y)$$

The above definition of the point z means that for each missed area there exist two adjacent known sides. One side belongs to some object that is closest to the viewer in this local area. The second side belongs to far objects or background (e.g., 115 in FIG. 1).

The point z is continued if the known border point in B(z) exists. If such a point, such as v, exists then a process to continue the border of segment s(v) into missed area is initiated.

First, a set of consequent points $\theta = \{v, v_1, v_2, \ldots\}$, $s(v_i) = s(v)$, $\chi(v_i) = 1$, $\forall i$ are generated. This set corresponds to the line that will be continued. Here, the number of points in the line is greater than some threshold $T_0$.

For set $\theta$, a calculation of the linear approximation is made by solving the minimization problem:

$$E(\Theta, \alpha, \beta) = \sum_{v \in \Theta} \|v_h - (\alpha v_w + \beta)\|^2 \to \min_{\alpha, \beta}.$$

The solution pair $(\alpha^*, \beta^*)$ could be found by use of mean squared errors method. If the value $$\frac{E(\Theta, \alpha*, \beta*)}{|\Theta|} > T_1,$$

then don't proceed with this curve, since it is detected not to be a line.

All points $y \in \Omega$ which coordinates correspond to the equality $$y_h = [\alpha^* y_w + \beta^*],$$

where [•] defines rounding to the closest integer, are marked as a border.

The border continuation procedure is applied for all points in an. In this manner, the range of values for the function $\chi(\bullet)$ may be expanded on unknown area.

Herein, we define around border factor by:

$$\hat{\chi}(x) = \frac{\sum_{y \in B(x)=X(y)}}{|B(x)|}.$$

Example of an illustrative borders continuation operation is shown in FIGS. 3A-C. FIG. 3A shows an image to be inpainted with the missing areas depicted at 305. FIG. 3B illustrates borders information for the known area and FIG. 3C depicts borders information continued into the missed area.

Referring to the borders continuation operation 210 of process 200, the preferable patches definition operation uses the continued borders information of operation 205. According to the continued borders determined at operation 205, segments are defined that are preferable for a given pixel in the missed area.

Figure 4:
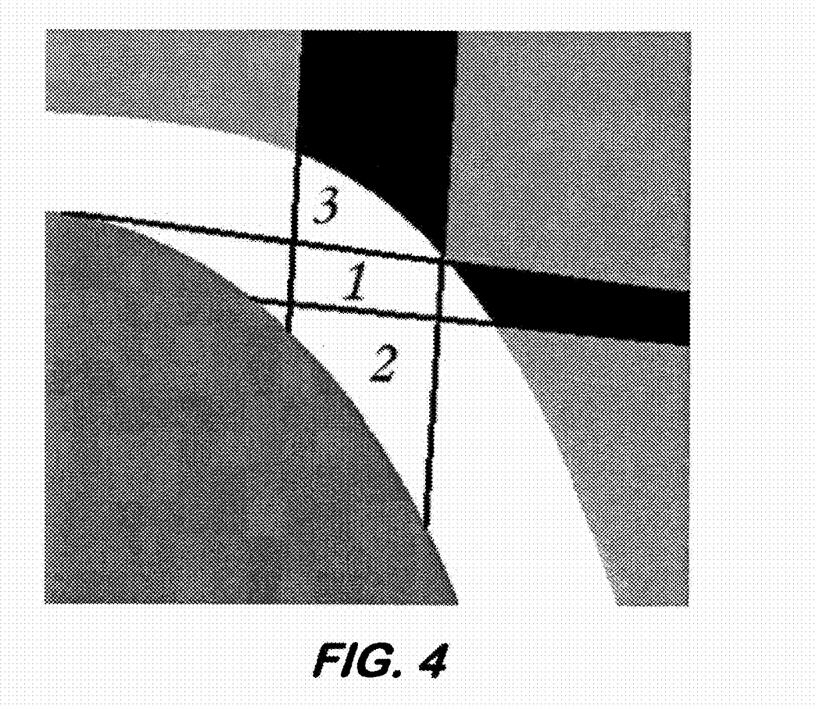
FIG. 4 illustrates a depiction of alternative image patches, in accordance with an embodiment.

In some embodiments, each bordered area Y in a missed region has three possible alternatives (see FIG. 4). The three alternatives include:

1. All adjacent areas are missed.
2. There exist known segments that are adjacent to Y, but these segments belong to a close or near object of the image.
3. There exist known segments that are adjacent to Y and they belong to far or background object(s).

In the first and second cases above, the list of preferable segments to copy for the missed region is empty. In the third case, the list of preferable patches includes the patches having centers belonging to the adjacent segments. Thus, the preferable patches will be those patches that satisfy condition (3).

Referring back to the local optimum 3D by structure propagation 215 of process 200, it is noted that a general idea of image 3D inpainting by structure propagation rests in the consequent excess of $\partial\Omega$ pixels in some order and for each of them finding some "good" block (i.e., patch) in the known area that will fill the area near the unknown pixels.

Here, we define $\Psi(x)$, $x \in I$, a quadratic pixels block of size N×N with center at x. As shown in equation [1] below, the processes herein may calculate the following confidence and data terms for all border points $\partial\Omega$.

Figure 5:
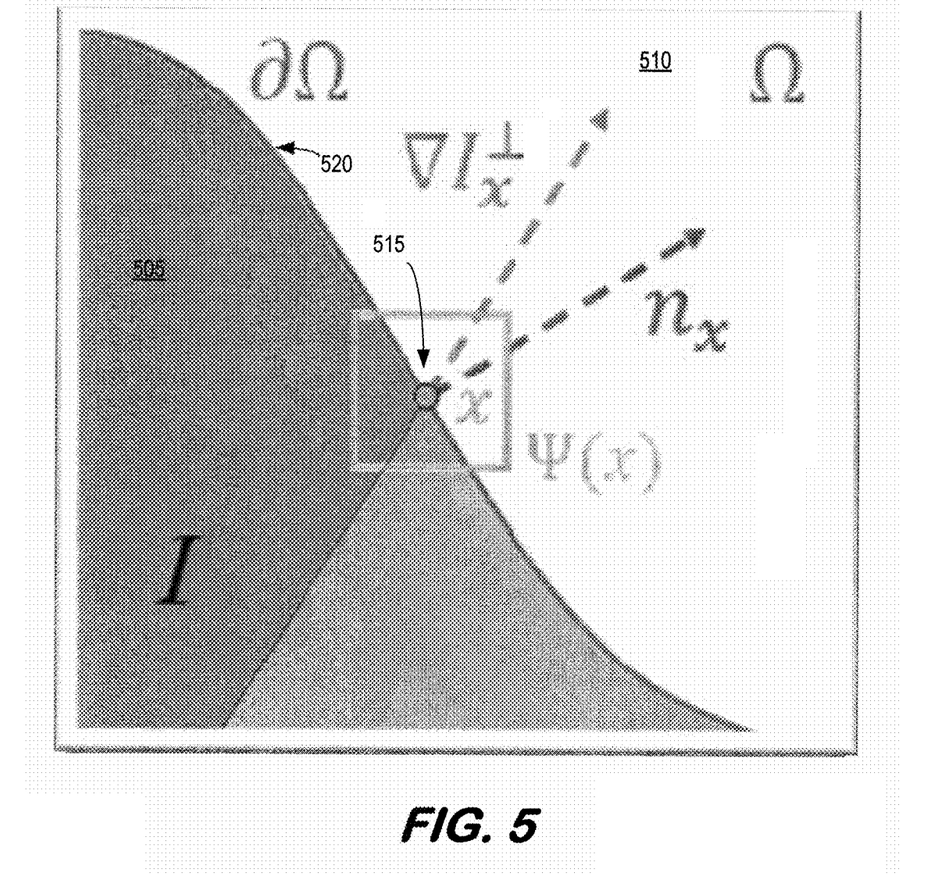
FIG. 5 depicts aspects for calculating parameters herein, in accordance with an embodiment.

In some embodiments, the confidence term is given by $$C(x) = \frac{\sum_{y \in \psi(x) \cap \overline{\Omega}} C(y)}{|\psi(x)|},$$

where $C(y) = 1$, $y \in \overline{\Omega}$; and
the data term is calculated as $$D(x) = \frac{|\nabla I_x^\perp n_x|}{\gamma}, \tag{1}$$

where $\nabla I_x^\perp$ is isophote vector (the vector orthogonal to the image gradient in the point x), $n_x$ is the normal vector to the contour of $\partial\Omega$ in the point x, $\gamma = 255$. An illustrative depiction of these defined relationships is graphically illustrated in FIG. 5.

Also, the depth term is calculated for bound pixels as:

$$d(x) = \frac{\sum_{y \in \psi(x) \cap \bar{\Omega}} d(y)}{|\psi(x) \cap \bar{\Omega}|}$$

Further, the process calculates the priority function for the pixels from $\partial\Omega$ as $$P(x) = c_1 \chi(x) + c_2 \hat{\chi}(x) + c_3 C(x) D(x),$$

where $c_1$, $c_2$, $c_3$ are some real constant values. The order $\prec$ on border points may now be calculated. According to this order, $$x \prec y \Leftrightarrow d(x) < d(y) \lor d(x) = d(y), P(x) > P(y).$$

At each step of 3D inpainting algorithm herein, the process chooses the point from $\partial\Omega$ that is the first in the stated order. For a given point, the process finds the patch $\Psi(p^*)$ that delivers the minimum to the following function:

$$\rho(\psi(x), \psi(p)) = c_4 c_5 \sum_{\eta \in \psi(x) \cap \bar{\Omega}} [(\eta_r - \xi_r)^2 + (\eta_g - \xi_g)^2 + (\eta_b - \xi_b)^2],$$

where the coefficients $c_4$ and $c_5$ are defined in the following way.

$$c_4 = \begin{cases} 1, & \exists x_0 \in \psi(x), p_0 \in \psi(p) : \chi(x_0) = \chi(p_0) = 1 \\ 1, & \forall x_0 \in \psi(x), p_0 \in \psi(p) : \chi(x_0) = \chi(p_0) = 0, \\ T_2 > 1, & \text{otherwise} \end{cases}$$

$$C_5 = \begin{cases} 1, & \text{if the list of preferable patches is empty for } x \text{ or it contains } \psi(p) \\ T_3 > 1, & \text{otherwise} \end{cases}$$

The patch $\Psi(p)$ is copied in the $\Psi(x)$ for all points belong to $\Psi(x) \cap \Omega$. The border $\partial\Omega$ is updated and the process continued until $\partial\Omega$ is not empty.

Figure 6:
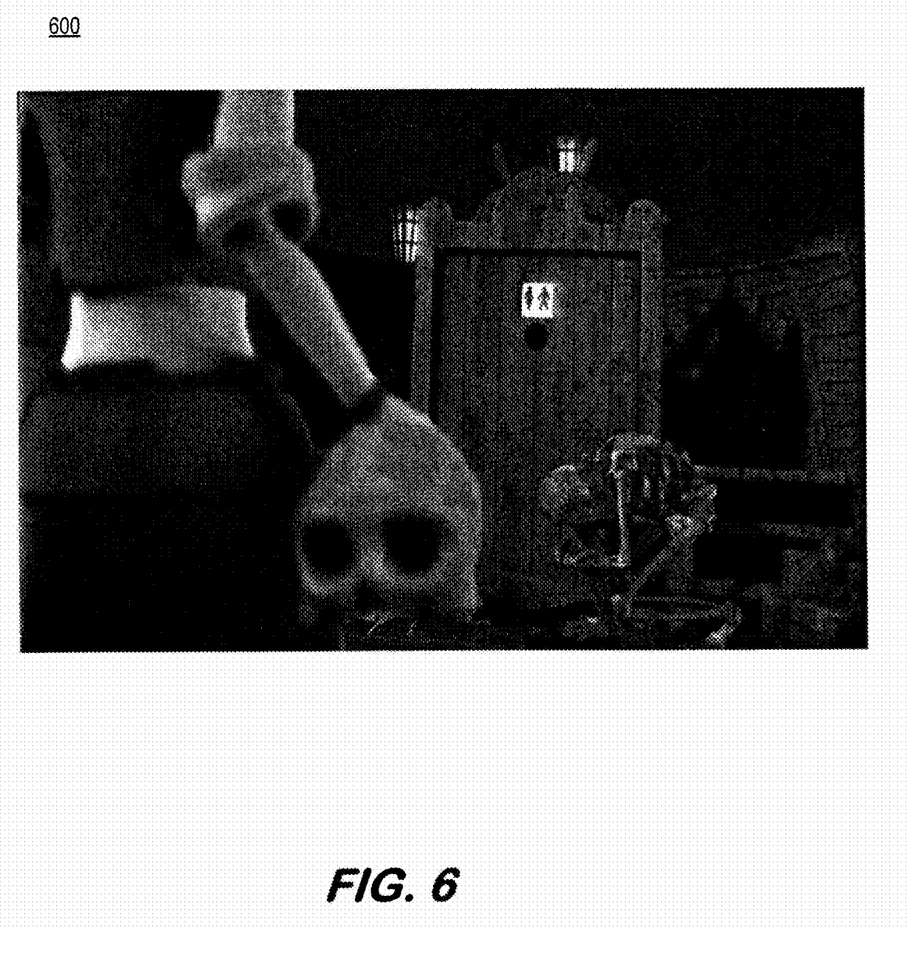
FIG. 6 illustrates a depiction of the image of FIG. 1 after being processed in accordance with the methods herein.

FIG. 6 is an illustrative depiction of the image introduced in FIGS. 3A-3C after the image 600 has been processed in accordance with the inpainting process disclosed herein. As seen, the border areas between the arm and hand of the person in the image is clearly defined.

In some embodiments herein, information concerning principal borders structure and depth is used in the inpainting process. The use of such information is beneficial and offers advantages to the disclosed processes.

For example, the information about gradient value of pixels near $\partial\Omega$ in equation (1) shows whether some border touches $\partial\Omega$ at a point (FIG. 5, point 515). FIG. 5 also shows an image I including a near object 505, an unknown region 510 ($\Omega$), and the border $\partial\Omega$ (520) related to point 515. But, this information makes no distinction between global structures of objects (refer to herein as borders) and texture components. Thus, processes herein extend the global structure information first. For this purpose, processes herein continue borders first to determine the most significant parts of the missed area.

In some aspects, if a mistake is made in the borders continuation stage of the inpainting process, there may be an opportunity to correct it at the missed region filling stage. In this manner, the present disclosure may provide advantages in contrast to other techniques.

According to the specificity of missed areas location (near the closed-view objects), the processes herein may need to fill the regions with either background or distant-view objects. To obtain this effect, methods herein may use the known depth information in the order of pixels processing definition. It is noted that some previous works in this area addressed this effect by using depth in difference calculations between patches. In contrast, the approach herein is advantageous because depth is usually not precisely calculated. Thus, on the one hand we can trust to the information that one pixel is relatively closer than another and on the other hand we cannot trust the given pixel depth since it is only an approximation.

Figure 7:
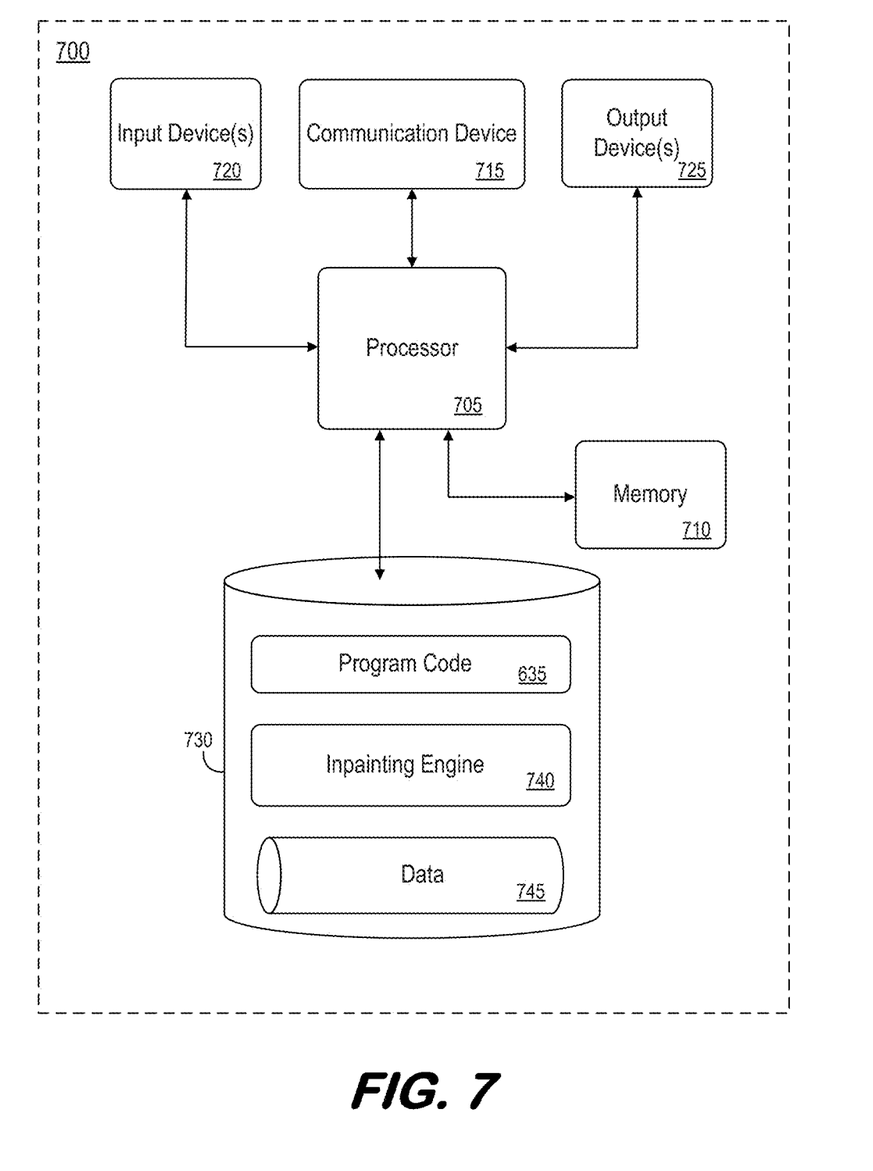
FIG. 7 illustrates a block diagram of an image processing system that may generate disparity maps in accordance with some embodiments herein.

FIG. 7 is a block diagram overview of a system or apparatus 700 according to some embodiments. System 700 may be, for example, associated with any device to implement the methods and processes described herein, including for example client devices and a server of a business service provider that provisions software products. System 700 comprises a processor 705, such as one or more commercially available Central Processing Units (CPUs) in the form of one-chip microprocessors or a multi-core processor, coupled to a communication device 715 configured to communicate via a communication network (not shown in FIG. 7) to another device or system. In the instance system 700 comprises an application server, communication device 715 may provide a means for system 700 to interface with a client device. System 700 may also include a local memory 710, such as RAM memory modules. The system 700 further includes an input device 720 (e.g., a touch screen, mouse and/or keyboard to enter content) and an output device 725 (e.g., a computer monitor to display a user interface element).

Processor 705 communicates with a storage device 730. Storage device 730 may comprise any appropriate information storage device, including combinations of magnetic storage devices (e.g., a hard disk drive), optical storage devices, and/or semiconductor memory devices. In some embodiments, storage device may comprise a database system.

Storage device 730 stores a program code 735 that may provide computer executable instructions for processing requests from, for example, client devices in accordance with processes herein. Processor 705 may perform the instructions of the program 735 to thereby operate in accordance with any of the embodiments described herein. Program code 735 may be stored in a compressed, uncompiled and/or encrypted format. Program code 735 may furthermore include other program elements, such as an operating system, a database management system, and/or device drivers used by the processor 705 to interface with, for example, peripheral devices. Storage device 730 may also include data 745. Data 745, in conjunction with inpainting engine 740, may be used by system 700, in some aspects, in performing the processes herein, such as process 200.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, the method comprising:
continuing border lines into an unknown region of an image from a known background;
determining segments, based on the continued borders, for the unknown region of the image, the determining of the segments being based on a determination of a classification for the unknown region, wherein the classifications for the unknown region comprises:
a classification where all adjacent areas are missed;
a classification where there exist known segments that are adjacent to the region but these segments belong to a near object of the image; and
a classification where there exist known segments that are adjacent to the region and they belong to a background object(s); and
propagating pixels from a known area of the image to the unknown area based on the determined segments and continued borders.

2. The method of claim 1, further comprising determining a border between the known region of the image and the unknown region of the image.

3. The method of claim 1, wherein the continuing of the border lines into the unknown region of the image generates an approximation of direct border lines into the unknown region.

4. A system, the system comprises:
a machine readable medium having processor executable instructions stored thereon; and
a processor to execute the instructions to:
continue border lines into an unknown region of an image from a known background;
determine segments, based on the continued borders, for the unknown region of the image, the determining of the segments being based on a determination of a classification for the unknown region, wherein the classifications for the unknown region comprises:
a classification where all adjacent areas are missed;
a classification where there exist known segments that are adjacent to the region but these segments belong to a near object of the image; and
a classification where there exist known segments that are adjacent to the region and they belong to a background object(s); and
propagate pixels from a known area of the image to the unknown area based on the determined segments and continued borders.

5. The system of claim 4, further comprising determining a border between the known region of the image and the unknown region of the image.

6. The system of claim 4, wherein the continuing of the border lines into the unknown region of the image generates an approximation of direct border lines into the unknown region.

7. A system, the system comprises:
a memory;
a machine readable medium having processor executable instructions stored thereon; and
a processor to execute the instructions to:
continue border lines into an unknown region of an image from a known background:
determine segments, based on the continued borders, for the unknown region of the image, the determining of the segments being based on a determination of a classification for the unknown region, wherein the classifications for the unknown region comprises:
a classification where all adjacent areas are missed;
a classification where there exist known segments that are adjacent to the region but these segments belong to a near object of the image; and
a classification where there exist known segments that are adjacent to the region and they belong to a background object(s); and
propagate pixels from a known area of the image to the unknown area based on the determined segments and continued borders.

8. The system of claim 7, further comprising determining a border between the known region of the image and the unknown region of the image.

9. The system of claim 7, wherein the continuing of the border lines into the unknown region of the image generates an approximation of direct border lines into the unknown region.

10. An article of manufacture, the article comprising:
a non-transitory computer readable medium having program instructions stored thereon which, when executed by a processor, cause the processor to:
continue border lines into an unknown region of an image from a known background;
determine segments, based on the continued borders, for the unknown region of the image, the determining of the segments being based on a determination of a classification for the unknown region, wherein the classifications for the unknown region comprises:
a classification where all adjacent areas are missed;
a classification where there exist known segments that are adjacent to the region but these segments belong to a near object of the image; and
a classification where there exist known segments that are adjacent to the region and they belong to a background object(s); and
propagate pixels from a known area of the image to the unknown area based on the determined segments and continued borders.

11. The article of claim 10, further comprising determining a border between the known region of the image and the unknown region of the image.

12. The article of claim 10, wherein the continuing of the border lines into the unknown region of the image generates an approximation of direct border lines into the unknown region.

* * * * *